(12) United States Patent
Pun et al.

(10) Patent No.: US 8,615,058 B2
(45) Date of Patent: Dec. 24, 2013

(54) SIGNAL ACQUISITION SYSTEM

(75) Inventors: Ka Shun Carson Pun, San Diego, CA (US); Siavash Ekbatani, Laguna Niguel, CA (US); David Ho, San Diego, CA (US); Siukai Mak, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/246,612

(22) Filed: Sep. 27, 2011

(65) Prior Publication Data

US 2013/0077722 A1   Mar. 28, 2013

(51) Int. Cl.
*H03D 1/00* (2006.01)

(52) U.S. Cl.
USPC ........... 375/343; 375/141; 375/142; 375/143; 375/152; 375/E1.018; 375/136; 375/134; 375/133; 375/137; 375/145; 375/149; 375/150

(58) Field of Classification Search
USPC ............ 375/141, 142, 143, 152, E1.018, 136, 375/134, 133, 137, 145, 149, 150
See application file for complete search history.

(56) References Cited

U.S. PATENT DOCUMENTS

| 4,527,275 | A  | * | 7/1985  | Russell      | 375/145 |
|-----------|----|---|---------|--------------|---------|
| 5,621,773 | A  | * | 4/1997  | Varma et al. | 375/368 |
| 8,335,283 | B1 | * | 12/2012 | Sun          | 375/343 |
| 8,385,440 | B2 | * | 2/2013  | Zhang et al. | 375/260 |

OTHER PUBLICATIONS

Huang et al. US design and implementation of synchronization detection fro IEEE 802.15.3c, Apr. 2011; pp. (1-4).*
Author Unknown, WGA Specification, WGA-D1.1.1, pp. 361-424, Section 21.1.1 Scope, dated Apr. 2011.
B.M. Popovic, Efficient Golay Correlator, in Electronics Letters, Aug. 19, 1999, vol. 35, Issue 17, pp. 1427-1428.

* cited by examiner

*Primary Examiner* — Daniel Washburn
*Assistant Examiner* — Rahel Guarino
(74) *Attorney, Agent, or Firm* — Brinks Gilson & Lione

(57) ABSTRACT

A signal acquisition system efficiently acquires a transmitted signal even at very low power. The system may synchronize to a preamble structure in the transmitted signal and, for example, determine timing parameters that locate the preamble with respect to system timing or other clock references. The system is particularly effective at acquiring weak power signals and is also robust against significant noise and other impairments, and therefore improves the ability of a receiving device that incorporates the signal acquisition system to acquire the signal and establish communication with other devices.

20 Claims, 9 Drawing Sheets

SIGNAL ACQUISITION SYSTEM

BACKGROUND

1. Technical Field

This disclosure relates to receiver synchronization techniques based on preamble structure of physical layer frames.

2. Related Art

The first version of the 802.11 wireless communication standard was ratified only 14 years ago, in 1997. While initial adoption of that technology was slow, today there is almost no end to the spectrum of electronic devices that incorporates wireless communication technologies (e.g., cell phones, global positioning system (GPS) devices, and laptop computers), nearly no end to the environments in which wireless communication devices are used (e.g., in the home and automobile), and nearly no end to the services consumed by wireless communication devices (e.g., streaming music and High Definition (HD) television). Consumer and business demand for wireless communication have driven, and continue to drive, significant advancements in wireless communication.

Advancements in data rate provide an example. The 802.11 standard rapidly evolved from originally providing only 1.2 Mbps throughput, to 11 Mbps under 802.11b, to 54 Mpbs under 802.11g, to 600 Mpbs under 802.11n. At the same time, audio and video technology have evolved, and the massive amounts of data needed to provide HD video (e.g., 1920× 1080 video) and other services now drive a further need for improved wireless data rate and capacity. Partially in response to this need, version 1.0 of the 60 GHz Wireless Gigabit Alliance (WiGig) specification provides data transmission rates of up to 7 Gbps, which is more than 10 times faster than the highest data rate that the 802.11n standard supports.

However, no wireless device can take advantage of the extensive array of wireless services now available, without first having the ability to acquire the transmitted signal. There are so many impairments that can affect the wireless waveform that the transmitted signal must be carefully designed (e.g., to include synchronization and channel estimation preambles), and even more carefully processed upon reception, to provide the receiving device with some realistic opportunity to successfully recover any data. These impairments include, as examples, multipath interference, frequency offsets, power fades, imperfections in the receiver front end (e.g., imperfections in the receive antenna, demodulator, analog to digital converters, mixers, and other front end logic).

For these reasons and others, acquiring the transmitted signal is not a trivial matter. Further improvements in signal acquisition are needed, particularly with regard to acquiring weak power signals. Being able to acquire weaker signals also increases the opportunities for recovering data over longer distances.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
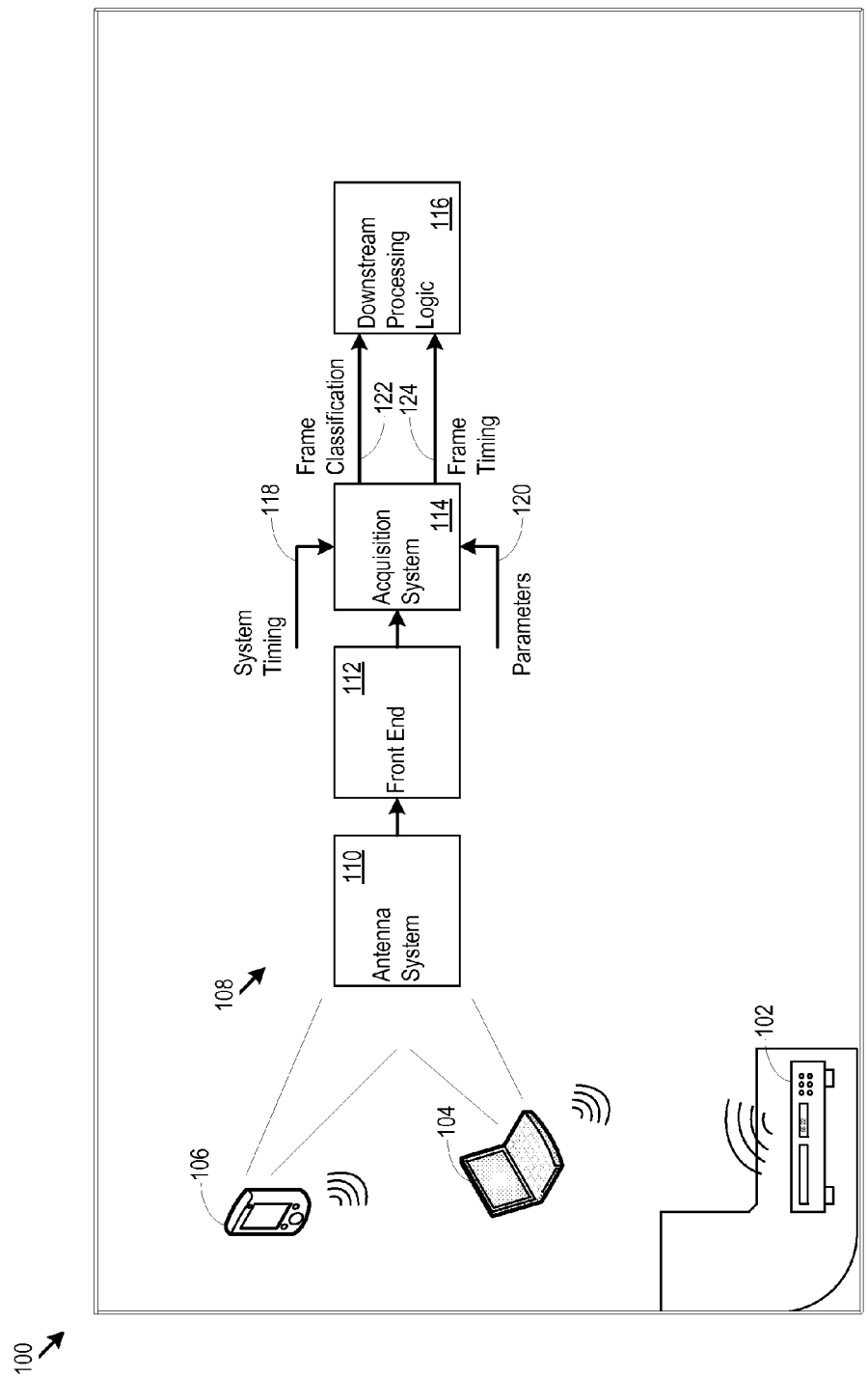
FIG. 1 shows a physical environment in which two endpoints are communicating.

FIG. 1 shows a communication environment 100 in which two endpoints are communicating. The endpoints may take many different forms. As examples, the endpoints may be cell phones, smart phones, laptop computers, personal data assistants, pocket computers, tablet computers, portable email devices, people or animals, or processes or threads executed in memory by a processor. Additional examples of endpoints include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of endpoints include musical instruments, microphones, climate control systems, intrusion alarms, audio/video surveillance or security equipment, video games, network attached storage, network routers and gateways, pet tracking collars, or other devices.

Endpoints may be found in virtually any context, including the home, business, public spaces, automobile, or airplanes. Thus, as additional examples, endpoints may further include automobile audio head ends or DVD players, satellite music transceivers, noise cancellation systems, voice recognition systems, climate control systems, navigation systems, alarm systems, engine computer systems, or other devices.

In the example in FIG. 1, the environment 100 is a conference room in a law firm. In the environment 100, a media player 102 (e.g., a Blu-Ray™ player) streams high definition video and audio content to a laptop computer 104 and a cellphone 106. There may be any number or type of endpoints in the environment 100 that communicate wirelessly with one another, such as conference bridges, Liquid Crystal Display (LCD) televisions, or presence monitoring systems.

The endpoints may communicate wirelessly using the 802.11a/b/g/n standards, according to the WiGig 60 GHz specification, or according to other wireless standards. In the detailed discussion below, the endpoints are assumed to be communicating using the WiGig standard. Accordingly, the discussion below specifically addresses signal preambles formed using Golay Sequences of certain types and lengths. However, it is noted that the signal acquisition techniques described below may be employed as part of an endpoint that communicates according to other communication protocols or standards. That is, the signal acquisition techniques may be adapted to process other preambles of different lengths or constitution as defined under other wireless protocols now known or developed in the future. The preambles preferably have periodic components with good autocorrelation properties. Therefore, the signal acquisition techniques described below are not limited to communication according to the 60 GHz WiGig specification.

Before any endpoint may take advantage of the data or services communicated wirelessly in the environment 100, the endpoint must acquire the transmitted signal. FIG. 1 shows that each endpoint may include processing logic 108 that facilitates acquiring the transmitted signal and therefore establishing communication with other endpoints. FIG. 1 shows one example implementation of the processing logic 108, but it is noted that each endpoint may include additional or different processing logic.

The processing logic 108 includes an antenna system 110. The antenna system may include one or more antennas that sense the transmitted signal and that deliver the sensed signal to the front end 112. The front end 112 may include mixers that shift the sensed signal to an intermediate frequency (IF) or baseband frequency, amplifiers (such as automatic gain control amplifiers), demodulators, analog to digital converters, or other processing circuitry. Because no part of the antenna system 110 or the processing circuitry in the front end 112 is perfect, the antenna system 110 and each part of the processing circuitry in the front end 112 may distort, mask, or otherwise impair the sensed signal, making the sensed signal potentially more difficult to acquire. This is particularly true with respect to signals that are already weak in power because, for example, the transmitting endpoint is distant, or is near but is unable to transmit strong signals.

Even when challenged by such weak signals, the acquisition system 114 (described in more detail below) is able to acquire the transmitted signal. In that regard, the acquisition system 114 may detect and synchronize (e.g., in time) to the preamble structure in the transmitted signal. Furthermore, the acquisition system 114 may classify the transmitted signal as belonging to a certain type of transmitted signal. For example, with respect to the WiGig specification, the acquisition system 114 may classify the transmitted signal as a single carrier signal or as a control PHY signal. Other classifications may be made consistent with the WiGig specification, or with respect to transmitted signals adhering to other standards.

As will be explained in more detail below, the acquisition system 114 may perform its analysis taking into account system timing 118 and adjustable parameters 120. The outputs of the acquisition system 114 may include frame classification information 122 and frame timing information 124, or other information. The acquisition system 114 communicates the output information to the downstream processing logic 116. The downstream processing logic 116 may include any type of processing logic that, once the signal is acquired, obtains the data from the transmitted signal and manipulates it for whatever purpose is desired. For example, the downstream processing logic 116 may extract data from the transmitted signal, process it with an audio or video codec, and pass the resulting media stream through speakers or to a display output.

The discussion below proceeds with respect to the acquisition system 114 processing the types of preambles defined in the WiGig specification. The structure and content of the preamble facilitate frame and packet detection, automatic gain control, frequency offset estimation, channel estimation, and other features. In the WiGig specification, the preamble is composed of a short training field (STF) and a channel estimation field. The STF is transmitted as repetitions of the length 128 Golay complementary sequences Ga and Gb. In particular, for the single carrier class of frames, the STF includes 16 repetitions of the length 128 Golay sequence Ga, followed by a single repetition of the inverse of Ga, namely −Ga. For the control PHY class of frames, the STF is composed of 48 repetitions of the length 128 Golay sequence Gb, followed by a single instance of −Gb, followed by a single instance of −Ga. The inverse Golay sequences provide a 180 degree phase rotation (i.e., a phase reverse) in the STF. The acquisition system 114 detects the phase inversion during its analysis of the received signal to help ascertain the frame classification information 122 and frame timing information 124.

Figure 2:
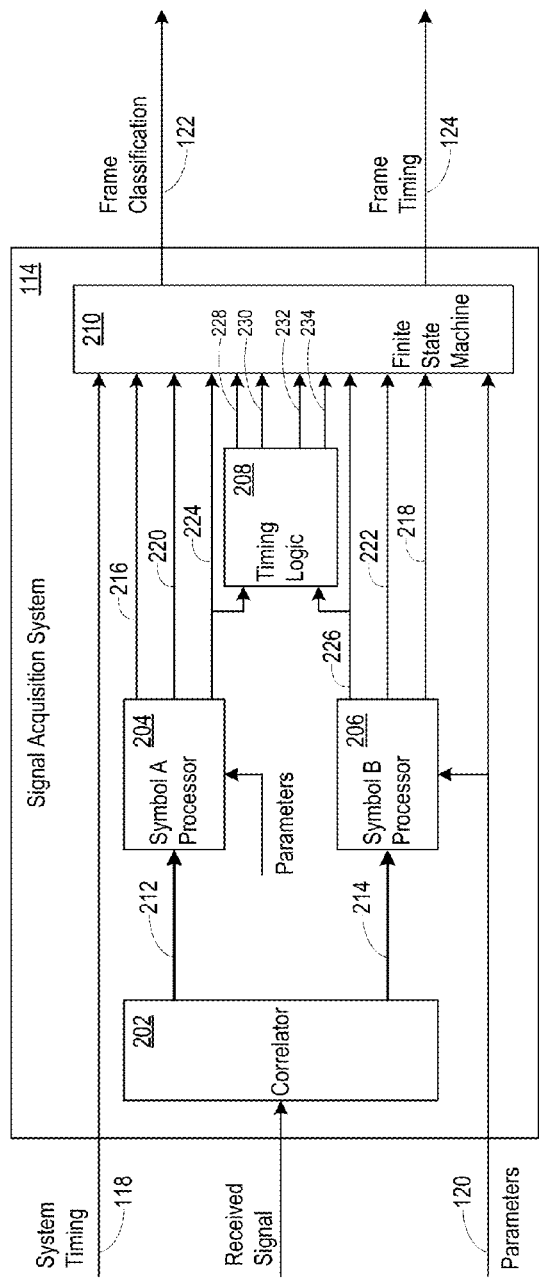
FIG. 2 shows a signal acquisition system.

FIG. 2 shows a block diagram of the signal acquisition system 114. The signal acquisition system 114 includes a correlator 202, a symbol A processor 204, and a symbol B processor 206. The signal acquisition system 114 also includes timing circuitry 208 and a finite state machine 210.

The correlator 202 determines autocorrelation sequences against a predetermined bit pattern with respect to the received signal. The received signal includes a synchronization field that is expected to include repetitions of the predetermined bit pattern. For example, the synchronization field may be the STF, and the predetermined bit patterns may be the length 128 Golay complementary sequences. There are two such sequences Ga and Gb, and the correlator may output a corresponding bit pattern A correlation output 212 and a bit pattern B correlation output 214. In one implementation, the correlator 202 is implemented as noted in the paper Efficient Golay Correlator, Electronics Letters, 19 Aug. 1999, Volume 35, Issue 17, pp. 1427-1428.

In other implementations, the correlator 202 may output additional or fewer correlation outputs. For example, when the signal acquisition system 114 need only search for frames in the received signal that carry a particular bit pattern sequence (e.g., control PHY frames using Gb in the STF), the correlator 202 may output only a bit pattern correlation output for that particular bit pattern. In that case, the acquisition system 114 may only include a symbol processor for that particular bit pattern correlation output. Similarly, if the received signal includes more than two types of frames with more than two bit pattern sequences, then the correlator 202 may output a bit pattern correlation output for each bit pattern sequence that the signal acquisition system 114 searches for.

The bit pattern correlation outputs 212 and 214 give strong peaks when the correlation of the received signal samples matches the Ga sequence, for signal carrier frames, and gives strong peaks when the correlation of the STF portion of the received signal matches the Gb sequence, for control PHY frames. Because the Ga and Gb sequences are of length 128, the bit pattern correlation outputs 212 and 214 produce a length 128 correlation output, with the strong peak (if any) happening at a particular output position. One goal of the acquisition system 114 is to find the peak positions with a sufficiently strong amount of energy to indicate that a particular repetition of the predetermined bit pattern in the STF has been located. Another goal of the acquisition system 114 is to determine whether enough such positions exist to decide the received signal includes a particular class of frame, and what the timing of the frame is.

With regard to the single carrier class of frames, there are 16 repetitions of the length 128 Golay sequence Ga, followed by a single repetition of the inverse of Ga, namely −Ga. For the control PHY class of frames, the STF is composed of 48 repetitions of the length 128 Golay sequence Gb, followed by a single instance of −Gb, followed by a single instance of −Ga. The acquisition system 114 may determine, based on the bit pattern correlation outputs 212 and 214, how many (if any) of the repetitions are present in the received signal as one part of acquiring the received signal.

To that end, the signal acquisition system 114 includes a symbol A processor 204 and a symbol B processor 206. The symbol processors 204 and 206 may be implemented in the same or different manners. The symbol A processor 204 processes the bit pattern A correlation output 212 while the symbol processor 206 processes the bit pattern B correlation output 214. Each symbol processor may produce the following outputs:

a bitsum output that indicates the number of detections of the repeating bit pattern (e.g., the Ga sequence in the single carrier STF) that the symbol processor finds based on the bit pattern correlation output. FIG. 2 identifies the bitsum A output 216 and the bitsum B output 218;

a product output that indicates phase change in the repeating bit pattern (e.g., the phase change caused by the change from Ga to −Ga or from Gb to −Gb in the STF). The product output thereby helps determine frame timing by identifying when symbol processor finds the phase reversal in the STF caused by the inverted bit patterns that terminate the STF. FIG. 2 identifies the product A output 220 and the product B output 222; and a numeric output that indicates the amount of energy in the outputs 212 and 214 of the correlator 202. The numeric outputs provide a useful indicator of whether a frame has arrived, and are provided to both the timing logic 208 and the finite state machine 210 for analysis. FIG. 2 identifies the numeric A output 224 and the numeric B output 226.

The timing logic 208 accepts the numeric A output 224 and the numeric B output 226. The timing logic 208 determines the positions where the greatest amount of energy exists in the numeric A output 224 and the numeric B output 226. The outputs of the timing logic may include:

a maximum position A output 228 that indicates where, in the numeric A output 224, the maximum value exists. With regard to searching for the length 128 Golay sequences used in the preamble, for example, the maximum position A output may take on a value between 0 and 127;

a maximum value A value 230 that indicates the value at the position where the maximum is found;

a maximum position B output 232 that indicates where, in the numeric B output 226, the maximum value exists. Again, with regard to searching for the length 128 Golay sequences used in the preamble, for example, the maximum position B output may take on a value between 0 and 127; and a maximum position B value 234 that indicates the value at the position where the maximum is found.

The finite state machine 210 helps the signal acquisition system 114 determine frame timing. Although a state machine is used in one implementation, other types of decision logic may be used instead. The outputs of the finite state machine 210 include the frame classification output 122 and the frame timing output 124. The frame classification output 122 may indicate whether the acquired frames are single carrier mode frames or control PHY frames. As will be explained in more detail below, the finite state machine 210 may make this classification based on how many of the repetitions of the expected Ga or Gb bit patterns are present in the received signal. The frame timing output 124 may indicate when the phase inversion occurs in the STF portion of the preamble. As will also be explained in more detail below, the finite state machine 210 may determine the timing based on the phase change apparent in the received signal as the predetermined bit patterns change from Ga to −Ga or Gb to −Gb. The frame timing output informs the downstream processing logic 116 where other portions of the received frames are located, so that the downstream processing logic 116 may recover data payloads in the received frames, as an example.

FIG. 2 also shows that the signal acquisition system 114 operates with respect to the system timing input 118 and parameters input 120. The system timing input 118 may vary widely in implementation, and as one example, is driven by a 220 MHz clock that increments by 8 each clock tick, to provide a 1.76 GHz timing reference. The signal acquisition system 114 resolves signal acquisition to the granularity of an individual 1.76 GHz clock (e.g., using the search logic discussed below with regard to FIG. 5). The parameters input 120 specifies operating parameters for the logic within the signal acquisition system 114. Examples of the parameters include:

| Table: Parameters | |
|---|---|
| Parameter | Explanation |
| timeOutsc = 600 | time out for acquisition, non cp packet (in 220 MHz clk) |
| timeOutcp = 1000 | time out for acquisition, non sc packet (in 220 MHz clk) |
| timeOut = 2000000 | time out for whole system (in 220 MHz clk) |

Figure 3:
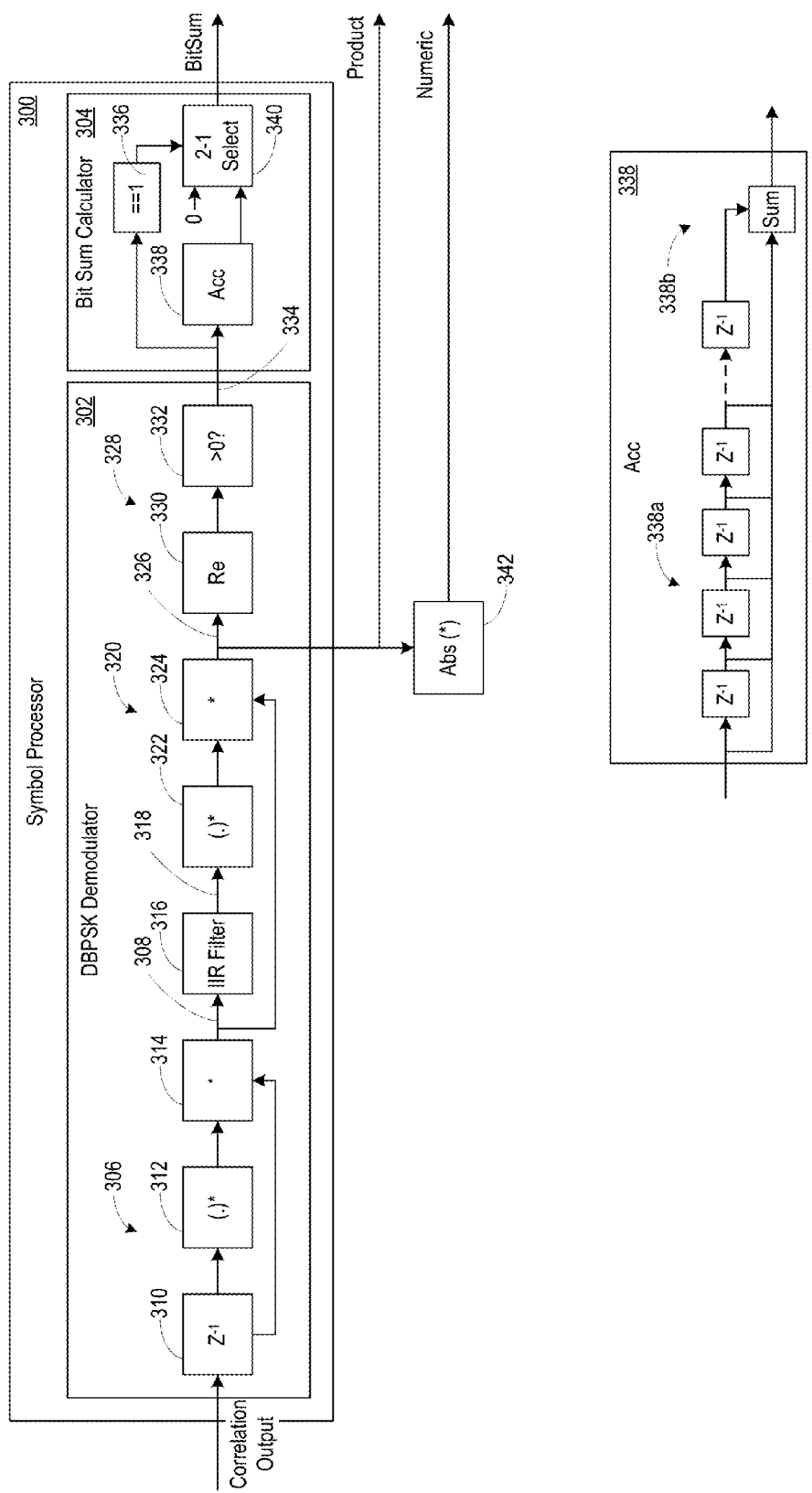
FIG. 3 shows a symbol processor that may be used in the signal acquisition system shown in FIG. 2.

FIG. 3 shows one example implementation of a symbol processor 300. The symbol processor 300 may implement the symbol A processor 204 and the symbol B processor 206, as examples. The symbol processor 300 includes a differential binary phase shift keying (DBPSK) demodulator 302 and a bit sum calculator 304.

The DBPSK demodulator 302 includes compensation logic 306 that adjusts the correlation outputs of the correlator 202 to remove frequency offset. For example, the compensation logic 306 may produce an adjusted correlation output 308 with a constant phase shift. In one implementation, the compensation logic 306 removes the frequency offset using a delay element 310 (e.g., a length 128 delay element), complex conjugate logic 312 to obtain the complex conjugate of its input, and a multiplier 314 that multiplies the complex conjugate of the delayed correlation output, with the correlation output.

The adjusted correlation output 308 is input to the filter 316. The filter 316 is programmable through the parameters input 120 as noted above in Table: Parameters. In one implementation, the filter 316 is a one pole infinite impulse response (IIR) filter. In the Symbol A processor 204, the IIR filter may have a symbol averaging forgetting factor, set by one of the input parameters 102 (e.g., acqSymAlphaSc=3 $(1-\frac{1}{2}^N, 0 \ldots 4)$). Similarly, in the Symbol B processor 206, the IIR filter may have a symbol averaging forgetting factor, set by one of the input parameters 102 (e.g., acqSymAlphaCp=3 $(1-\frac{1}{2}^N, 0 \ldots 4)$). The filter 316 accumulates power across multiple synchronization fields (e.g., across multiple STFs) to obtain an enhanced correlation output 318. Accumulating the power across multiple synchronization fields facilitates acquisition of low power received signals.

The estimation enhancement logic 320 includes complex conjugate logic 322 and a multiplier 324. The estimation enhancement logic 320 performs a multiplication of the enhanced correlation output 318 with its complex conjugate. The resultant estimation enhanced output 326 is therefore a large positive value when the symbol processor is operating on the Ga or Gb bit patterns in the STF (as opposed to noise, for example), and a large negative value when the symbol processor is operating on the −Ga or −Gb bit patterns in the STF. The estimation enhanced output 326 is provided to the finite state machine 210 and the timing logic 208 as the product output (e.g., the product outputs 220 and 222). The absolute value logic 342 determines the absolute value of the estimation enhanced output 326 and provides the absolute value as the numeric output (e.g., the numeric outputs 224 and 226) for consideration by the finite state machine 210 and the timing logic 208.

The threshold logic 328 evaluates the estimation enhanced output 326 to determine whether either any of the predetermined bit patterns (e.g., Ga, or Gb) are detected. To that end, the threshold logic 328 may include a Real part extractor 330 and comparison logic 332. The comparison logic 332 may compare the real part of the estimation enhanced output 326 to determine whether it is greater than zero (or some other threshold), for example. If so, the comparison logic 332 outputs a '1', otherwise the comparison logic 332 outputs a '0'. Accordingly, the threshold logic 328 provides a bitstream output 334 that provides an indicator (e.g., a '1') at each instance when the predetermined bit pattern is found in the received signal. Because the estimation enhanced output 326 is a negative value for the −Ga and −Gb bit patterns, the comparison logic 332 outputs a '0', signaling an end to the Ga or Gb repetitions and a possible phase reversal due to presence of −Ga or −Gb.

The bit sum calculator 304 includes a comparator 336, an accumulator 338, and an output selector 340. The accumulator 338 may accumulate the bitstream output 334 over a selected window length to determine, for example, how many '1' outputs have occurred until a '0' output occurs. The accumulator 338 may be implemented, for example, as a cascaded series of delay elements 338a and summing logic 338b. In one implementation, the bit sum calculator in the symbol A processor 204 accumulates the bitstream output 334 over a window length of 15 (e.g., there may be 15 delay elements 338a in series whose outputs are summed by the summing logic 338b), while the bit sum calculator in the symbol B processor 206 accumulates the bitstream output 334 over a window length of 50 (e.g., there may be 50 delay elements 338a in series whose outputs are summed by the summing logic 338b). Other window lengths may be used.

The bit sum calculator 304 outputs a matching count of the '1' values when the comparison logic 332 outputs a '0'. Otherwise, the output selector 340 outputs a '0' value (or some other pre-selected placeholder value) that may indicate that the symbol processor is still accumulating detections of the Ga or Gb bit patterns. The matching count is provided on the bit sum outputs (e.g., the bitsum output A 216 and the bitsum output B 218) for consideration by the finite state machine 210. As will be described in more detail below, if enough '1' outputs are accumulated before the '0' output (caused, e.g., by the phase reversal), then the finite state machine 210 may consider that as evidence that a STF has been successfully detected in the received signal. For the single carrier frames that include 16 repetitions of the Ga bit pattern, the bitstream output 334 may provide up to sixteen '1' outputs for the bit sum calculator 304 to accumuate. For the control PHY frames that include 48 repetitions of the Gb bit pattern, the bitstream output 334 may provide up to 48 '1' outputs for the bit sum calculator 304 to accumulate.

A serial to parallel converter may be used on the input into the symbol processor 300. In one implementation, the serial to parallel converter converts a serial bit stream (e.g., one bit at a time) on the correlation outputs into 128 bits of parallel data for processing by the symbol processor 300. Similarly, on the outputs (e.g., the bit sum, product, and numeric outputs), a parallel to serial converter may convert the parallel data back to a serial bit stream (e.g., one bit at a time).

Figure 4:
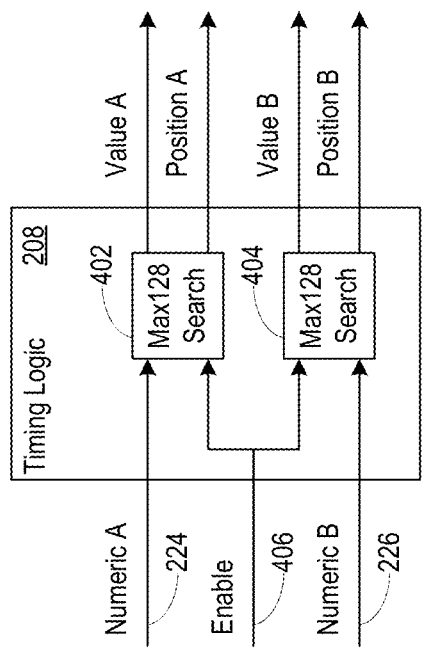
FIG. 4 shows timing circuitry that may be used in the signal acquisition system shown in FIG. 2.

FIG. 4 illustrates the timing logic 208. The timing logic accepts the length 128 numeric outputs from the symbol processor and determines the maximum value and position of the maximum value in the numeric outputs. To that end, the timing logic 208 includes search logic 402 for the numeric A output 224 and search logic 404 for the numeric B output 226. As explained below, with respect to FIG. 5, the timing logic 208 performs an efficient search under the direction of the enable signal 406.

Figure 5:
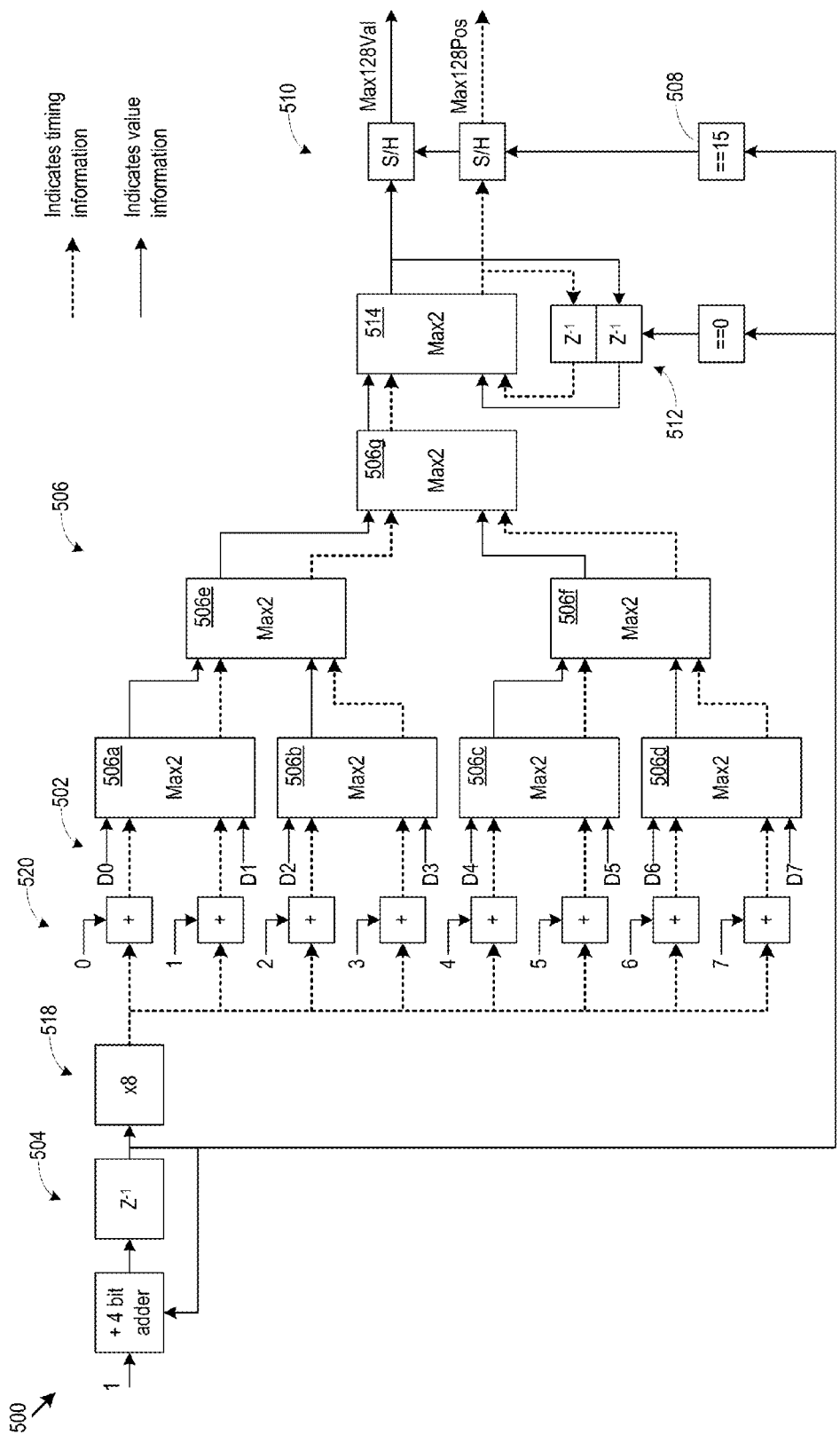
FIG. 5 shows a one hundred twenty eight (128) element maximum value and position search logic that may be used in the signal acquisition system shown in FIG. 2.

FIG. 5 shows search logic 500 that provides a 128 element maximum value and position search function (e.g., for every 128 samples). The search logic 500 may be used in the signal acquisition system as the search logic 402 or search logic 404. The data inputs 502 correspond to 8 bits at a time of the numeric inputs (e.g., the numeric A input 224). The enable signal 406 may be implemented by presenting a '1' input value to the adder in the timing logic 504 to allow the timing logic 504 to increment its count over 16 iterations of searches. The cascading sequence 506 of seven max 2 search units 506a, 506b, 506c, 506d, 506e, 506f, and 506g performs a search to determine the greatest value and the corresponding position of the current set of 8 data inputs.

The greatest value and position found in each set of 8 data inputs is fed back through the delay elements 512 and into a max 2 search unit 514. The max 2 search unit 514 compares the prior greatest value and position against the current greatest value and position determined by the search units 506. Between the two sets, the search unit 514 retains the greatest value and its corresponding position. At each increment of the timing logic 504, the multiplier 518 and adders 520 calculate, for use as timing information, the data range being searched (e.g., samples 0 to 7, 8 to 15, 16 to 23, . . . 120 to 127).

After 16 iterations, the search logic 500 has searched 128 data values and found the greatest value and location at the granularity of an individual sample. At that point (when the timing logic 504 has counted from 0 to 15), the comparator 508 asserts an output control signal to the sample and hold logic 510. The sample and hold logic 510 responds by outputting the greatest value and the position of the greatest value of the last 128 data inputs on the value and position outputs. For a search on both the numeric A and numeric B inputs, the value and position outputs may correspond to the outputs 228, 230, 232, and 234 described above in FIG. 7.

Figure 6:
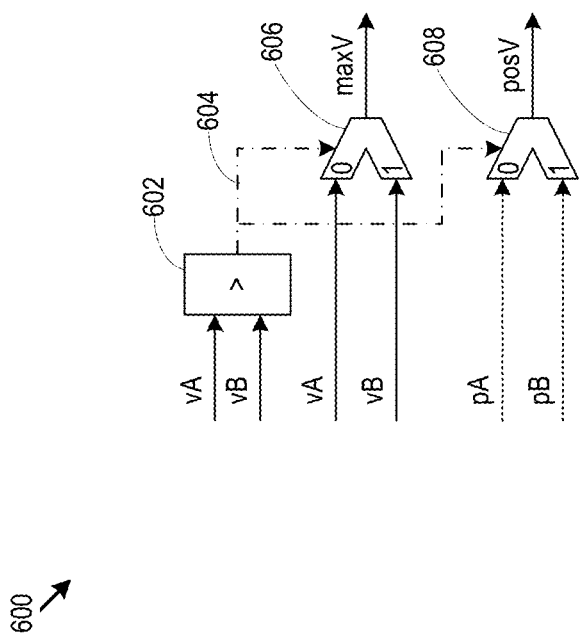
FIG. 6 shows a two (2) element maximum value and position search logic that may be used in the signal acquisition system shown in FIG. 2.

FIG. 6 shows a search unit 600 that implements a 2 element maximum value and position search. The search unit 600 may be used as the max 2 search units shown in FIG. 5. The search unit accepts two value inputs vA and vB, and two position inputs pA and pB. The comparator 602 determines which of vA and vB is larger, and outputs a responsive selection control signal 604. The selection control signal 604 determines which of vA and vB that the two input multiplexer 606 outputs, and which of pA and pB the two input multiplexer 608 outputs.

Figure 7:
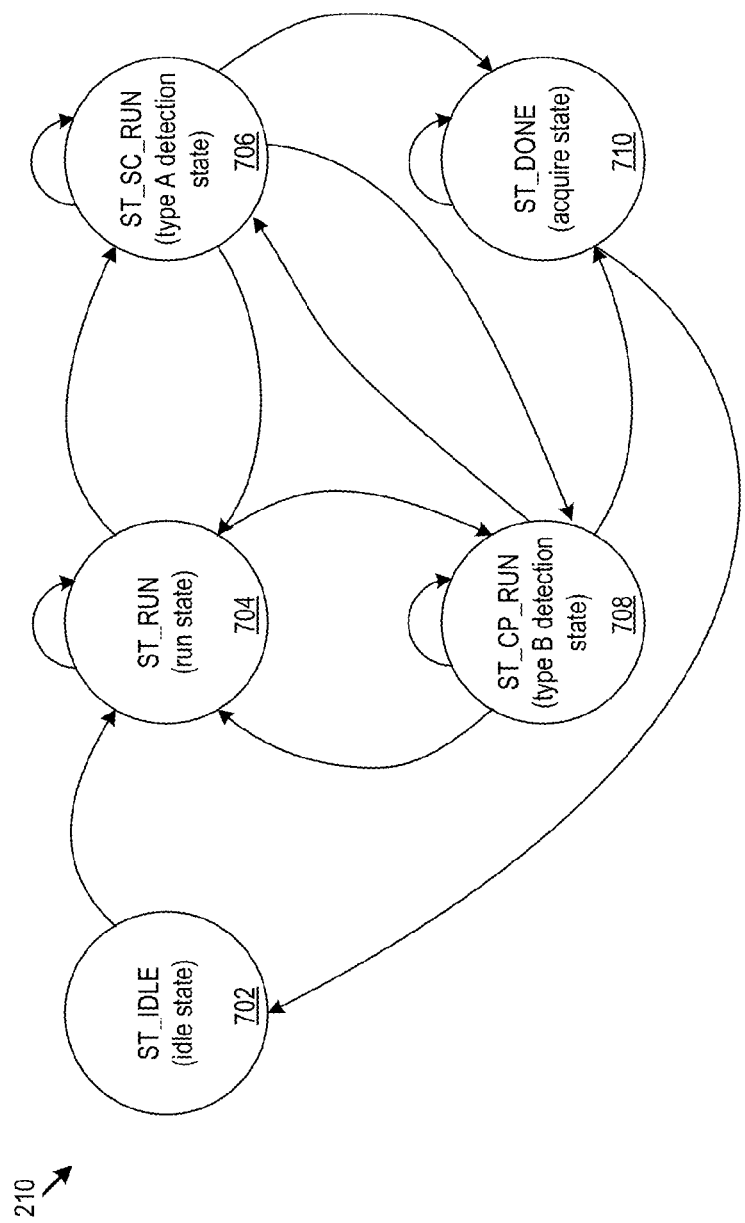
FIG. 7 shows a state machine that may be used in the signal acquisition system shown in FIG. 2 to determine when the system has acquired a signal.

FIG. 7 shows an example implementation of the finite state machine 210. The state machine 210 may be implemented in hardware or software or hardware and software. The state machine 210 includes an idle state 702 (ST_IDLE) and a run state 704 (ST_RUN). The state machine 210 also includes a type A decision state 706 (ST_SC_RUN), a type B decision state 708 (ST_CP_RUN), and an acquire state 710 (ST_DONE).

When the state machine 210 initializes, it may begin in the idle state 702. On the next clock cycle (e.g., the next clock of the 220 MHz system clock), the state machine 210 transitions to the run state 704. In the run state 704, the state machine 210 analyzes its inputs to determine whether the received signal looks like it has characteristics of a type A signal (e.g., a single carrier type of frame) or a type B signal (e.g., a control PHY frame). If the received signal looks sufficiently like a type A signal, the state machine 210 transitions to the type A detection state 706. On the other hand, if the received signal looks sufficiently like a type B signal, then the state machine 210 transitions to the type B detection state 708. From the type A detection state 706 and the type B detection state 708, additional state transitions define when the signal is acquired, and therefore when the state machine 210 transitions to the acquire state 710.

The state machine 210 receives the inputs summarized below in Table: State Machine Inputs.

| Table State Machine Inputs | |
|---|---|
| Input | Notes |
| bitsum A | The number of detections of the repeating bit pattern A (e.g., the Ga bit pattern in the single carrier STF). |
| product A | Indicates phase change in the repeating bit pattern (e.g., the phase change caused by the change from Ga to −Ga). |
| numeric A | An indicator of the amount of energy in the bit pattern A correlation output. |
| value A | The greatest amount of energy in the numeric A output. |
| position A | Where, in the numeric A output, the maximum value exists. |
| bitsum B | The number of detections of the repeating bit pattern B (e.g., the Gb bit pattern in the control PHY STF). |
| product B | Indicates phase change in the repeating bit pattern (e.g., the phase change caused by the change from Gb to −Gb in the STF). |
| numeric B | An indicator of the amount of energy in the bit pattern B correlation output. |
| value B | The greatest amount of energy in the numeric B output. |
| position B | Where, in the numeric B output, the maximum value exists. |

The transitions between states 704, 706, 708, and 710 may be made according to the following transition criteria shown in Table: Transition. When the state machine arrives in the acquire state 710, the state machine 210 determines that a signal has been acquired. At that time, the state machine 210 may output the frame classification 122 and the frame timing 124.

| Table Transition | | |
|---|---|---|
| From | To | Criteria |
| ST_IDLE | ST_RUN | Transition immediately upon reset |
| ST_RUN | ST_SC_RUN | If (packet Single Carrier is detected) && (already in "ST_RUN" for more than predefined number of clock cycles) The predetermined number of clock cycles may be given by an input parameter (e.g., acqTimeCntSc = 16), optionally provided on the parameter input 120. |
| ST_RUN | ST_CP_RUN | if (packet Control PHY is detected) && (already in "ST_RUN" for more than predefined cycles) The predetermined number of clock cycles may be given by an input parameter (e.g., acqTimeCntCp = 16), optionally provided on the parameter input 120. |
| ST_RUN | ST_RUN | If neither test is met to transition to ST_CP_RUN or ST_SC_RUN, then stay in ST_RUN |
| ST_SC_RUN | ST_RUN | if (acqSc) |
| | ST_SC_RUN | ST_SC_RUN->bigSigTrue->ST_RUN; |
| | ST_CP_RUN | acqSc->ST_DONE; |
| | ST_DONE | pktScDet->ST_SC_RUN; pktCpDet->ST_CP_RUN; ST_RUN; ST_SC_RUN->bigSigTrue->ST_RUN indicates that the system goes to the state ST_SC_RUN if the threshold is passed for returning to ST_RUN; acqSc->ST_DONE, indicates that if(acqSC), then transition to ST_DONE; pktScDet->ST_SC_RUN indicates that if(pktScDet), then transition to ST_SC_RUN pktCpDet->ST_CP_RUN indicates that if(pktCpDet), then transition to ST_CP_RUN |
| ST_CP_RUN | ST_RUN | if (acqSc) |
| | ST_SC_RUN | ST_SC_RUN->bigSigTrue->ST_RUN; |
| | ST_CP_RUN | acqSc->ST_DONE; |
| | ST_DONE | pktScDet->ST_SC_RUN; pktCpDet->ST_CP_RUN; ST_RUN; |
| ST_DONE | ST_IDLE | Reset, otherwise stay in ST_DONE |

Any of the parameters or values below may be specified by the parameters input 120. For determining bigSigTrue:

for each A and B waveform from the maximum value and position search logic 500, find the maximum and minimum (magnitude wise). Then if the ratio maximum/minimum is bigger than a large signal threshold, declare bigSigDet=true, otherwise, false. This detects whether there is an incoming significant signal. The preferred threshold may be set with input parameters 120 (e.g., acqTrgAcqSc=0.01, and acqTrgAcqCp=0.02).

Then, compare the bigSigDet and bigSigDetZ (delayed version of bigSigDet). If there is an abrupt change (false, false, . . . false, true) then declare bigSigTrue=true. The preferred delay may be set with input parameters 120 (e.g., bigSigCnt=100).

Determine that acqSc is true when the following conditions are met:
1) bigSigTrue=false;
2) Strobe generation from timing circuitry: the timing circuitry 500 provides a position output (0 . . . 127), and the strobe signal is true for samples at that particular position;
3) phaseChange generation: calculate the angle of the Product signal from the symbol processor 300 to determine if phase change is >180 degrees, to capture the phase change for the STF at the −Ga or −Gb change;
4) Absolute signal level detection:
if maxA, the maximum value output from the search logic 500, is bigger than a preset threshold (trgAcqSc);
5) bitSum pattern matching: if the bitSum output of the symbol processor 300 is greater than a bitsum pattern threshold (e.g., specified by parameter inputs 120 such as acqTrgBitSc=12 or acqTrgBitCp=40);
6) Stay in State: if tmpTimeCnt>timeCnt (i.e., if the state machine 210 has been in a given state for more than a selected length of time);

The parameter tmpTimeCnt may be a counter that increments by 8 samples until it passes a limit specified by another parameter, e.g., acqTimeCntSc=16 or acqTimeCntCp=16;

Determine that acqCp is true when the above six conditions are true, with respect to the symbol B processor 206 and timing logic 208 for the symbol B processing chain.

Figure 8:
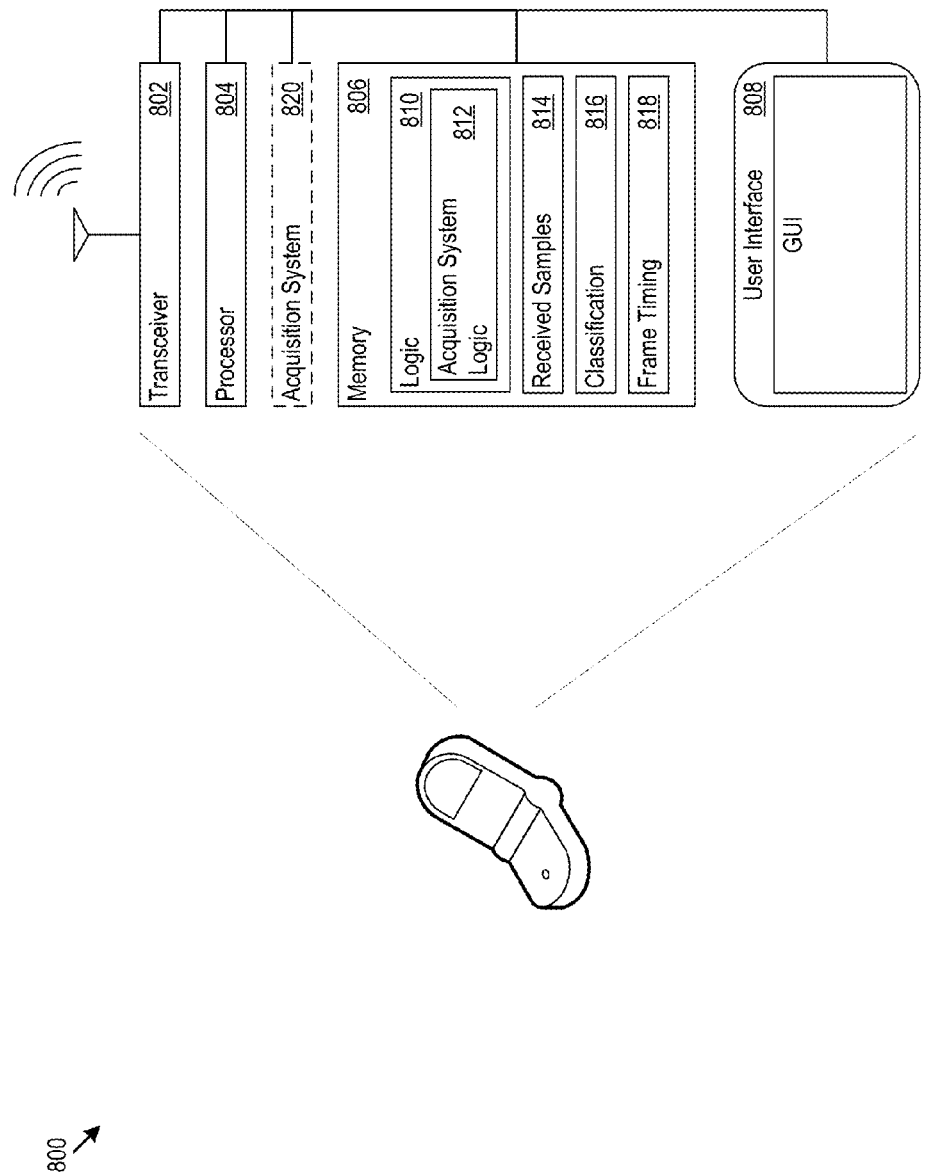
FIG. 8 shows an endpoint that may include the signal acquisition system.

The following may be implemented as flags that can take the values 0 or 1 to indicate whether a particular condition is met.

trgAcqSc (if maxA is bigger than a preset threshold, then trgAcqSc is true);
trgAcqCp (if maxB is bigger than a preset threshold, then trgAcqCp is true);
pktScDet (set when a single carrier frame is detected);
pktCpDet (set when a control PHY frame is detected);

FIG. 8 shows an endpoint 800 that may include the signal acquisition system. The endpoint 700 includes a transceiver 802, processor 804, a memory 806, and a user interface 808. The transceiver 802 may be wireless transceiver that, for example, supports signal reception and transmission according to the 60 GHz WiGig specification. However, the transceiver 802 may send and receive signals that adhere to any of a diverse array of formats, protocols, modulations, frequency channels, bit rates, and encodings that presently or in the future include preamble sections with repeating bit patterns with good autocorrelation properties for the signal acquisition system 114 to analyze. Thus, the transceiver 802 may support the 802.11a/b/g/n standards, the 60 GHz WiGig specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 804 executes the logic 810. The logic 810 may be an operating system, application program, firmware, or other logic. The logic 810 includes acquisition system logic 812 for analyzing the received signal samples 814 obtained by the transceiver 802. In this example, the acquisition system logic 812 implements, in processor executable instructions, the processing noted above with respect to FIGS. 3-7 to analyze the received sample data 814. For an acquired signal, the acquisition system logic 812 may determine a classification 816 (e.g., a single carrier classification or a control PHY classification) as well as frame timing 818 for use by other logic in the endpoint 800. The acquisition system 114 may be implemented in software alone, hardware alone, or as a combination of hardware and software. Thus, in other implementations, the endpoint 800 may include a hardware realization 820 of the acquisition system 114 that does not include processor executable instructions.

Figure 9:
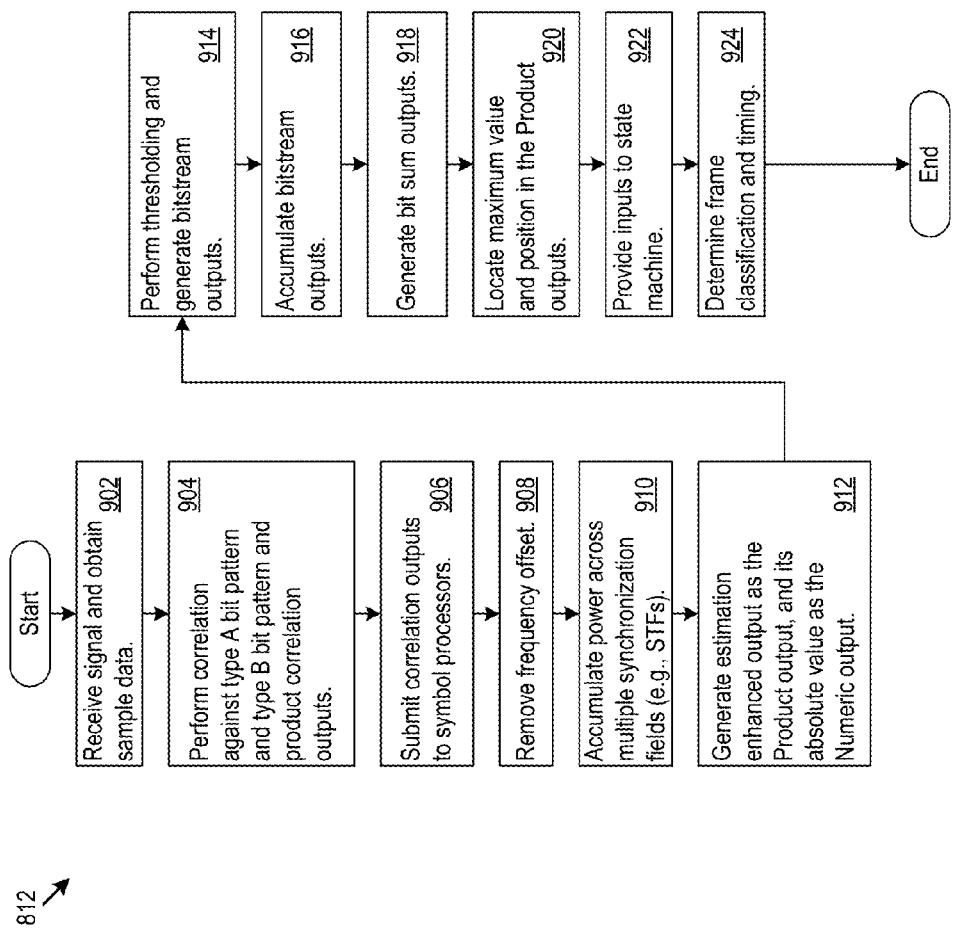
FIG. 9 shows a flow diagram of logic that a signal acquisition system may implement.

FIG. 9 shows a flow diagram of signal acquisition logic 812 that an endpoint 800 may execute. The transceiver 802 obtains sample data for a received signal (902) and may store in the memory 806 the corresponding received signal samples 814. The signal acquisition logic 812 may then perform a correlation analysis (904) against one or more predetermined bit patterns (e.g., the Ga or Gb bit patterns) to produce correlation outputs, such as the bit pattern A correlation output and the bit pattern B correlation output. The correlation outputs are submitted to symbol processors (906).

The signal acquisition logic 812 then removes frequency offset (908) and accumulates power (e.g., using an IIR filter) across multiple synchronization fields, such as across multiple STFs (910). In addition, the signal acquisition logic 812 generates estimation enhanced outputs (which may be given as the Product A and Product B outputs), and also generates the numeric outputs (e.g., the Numeric A and Numeric B outputs as the absolute value of the estimation enhanced outputs) (912).

The estimation enhanced output may be subjected to thresholding to generate bit stream outputs (914). The signal acquisition logic 812 then accumulates the bitstream outputs (916) and generates the corresponding bit sum outputs (916), for example when the bit sum calculator receives an indicator of a phase reversal in the received signal. Furthermore, the signal acquisition logic 812 may locate the maximum value and the maximum value position in the product outputs (920). The various received signal characteristics (e.g., those shown in Table State Machine Inputs) are provided to a state machine (922). The state machine undergoes state transitions to determine when a signal has been acquired, and within the signal, a frame classification and the frame timing (924).

The signal acquisition system described above efficiently acquires a transmitted signal. The system synchronizes to a preamble structure in the transmitted signal and, for example, determines timing parameters that locate the preamble with respect to system timing or other clock references. The system also classifies the type of received frame, for example, as a control PHY frame or a single carrier frame. The system is particularly effective at acquiring weak power signals and is also robust against significant noise and other impairments such as multipath interference, and distortion caused by non-perfect antennas, mixers, amplifiers, analog to digital converters, and other front end components. The system therefore improves the ability of a receiver to acquire the signal and establish communication with other devices. In particular, the ability of the system to acquire weak power signals desirably increases the range of effective communication between wireless devices, and increases the range of environments in which the wireless devices may be used (e.g., by providing better reception in homes or in conference rooms). In some simulations of the system, the system successfully acquires signals in environments as challenging as −10 to −12 db.

The methods, devices, and logic described above may be implemented in many different ways in many different combinations of hardware, software or both hardware and software. For example, all or parts of the acquisition system 114 may include circuitry in a controller, a microprocessor, or an application specific integrated circuit (ASIC), or may be implemented with discrete logic or components, or a combination of other types of analog or digital circuitry. All or part of the logic descried above may be implemented as instructions for execution by a processor, controller, or other processing device and may be stored in a machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for signal acquisition comprising:
   correlating, with a predetermined bit pattern, a received signal comprising a synchronization field expected to include repetitions of the predetermined bit pattern, to obtain a correlation output;
   processing the correlation output in a symbol processor to obtain a matching count that indicates a detected number of repetitions of the predetermined bit pattern;
   compensating the correlation output to adjust for frequency offset and obtain an adjusted correlation output;
   filtering the adjusted correlation output to accumulate power across multiple synchronization fields to obtain an enhanced correlation output; and
   when the enhanced correlation output exceeds a threshold, outputting a count signal for accumulation into the matching count; and
   providing the matching count to decision logic that decides whether a frame has been acquired within the received signal.

2. The method of claim 1, where processing the correlation output comprises:
   detecting a phase inversion in the synchronization field; and counting detections of the predetermined bit pattern, and outputting the matching count when the phase inversion is detected.

3. The method of claim 2, further comprising:
providing the phase inversion with the matching count to the decision logic that decides whether a frame has been acquired within the received signal.

4. The method of claim 3, where providing comprises:
providing the phase inversion with the matching count to a state machine that determines whether the frame has been acquired.

5. The method of claim 1, further comprising:
filtering the correlation output to accumulate power across multiple synchronization fields to obtain an enhanced correlation output; and
locating a maximum of the enhanced correlation output over time to locate the predetermined bit pattern with respect to a system timing source.

6. The method of claim 1, where the adjusted correlation output comprises a phase shift.

7. The method of claim 1, where the compensating comprises:
obtaining a complex conjugate of the correlation output; and
multiplying the correlation output with the complex conjugate 8. A signal acquisition system comprising:
a correlator operable to correlate, with a predetermined bit pattern, a received signal comprising a synchronization field expected to include repetitions of the predetermined bit pattern, to obtain a correlation output;
a symbol processor operable to process the correlation output to obtain a matching count that indicates a detected number of repetitions of the predetermined bit pattern, the symbol processor comprising a bit sum calculator configured to count detections of the predetermined bit pattern, and, when a phase inversion is detected output the matching count; and
decision logic configured to decide, based on the matching count, whether a frame has been acquired within the received signal.

9. The signal acquisition system of claim 8, further comprising, in the symbol processor:
a filter operable to accumulate power across multiple synchronization fields.

10. The signal acquisition system of claim 8, further comprising, in the symbol processor:
compensation logic in communication with the correlation output and operable to adjust the correlation output for frequency offset to obtain an adjusted correlation output;
a filter operable to accumulate power across multiple synchronization fields to obtain an enhanced correlation output; and
threshold logic operable to determine when the enhanced correlation output exceeds a threshold and output a count signal for accumulation into the matching count.

11. The signal acquisition system of claim 10, where the filter comprises a one pole infinite impulse response filter 12. The signal acquisition system of claim 8, where:
the decision logic is configured to decide, based on the matching count and the phase inversion, whether a frame has been acquired within the received signal.

13. The signal acquisition system of claim 12, where the decision logic comprises:
a state machine configured to determine whether the frame has been acquired.

14. The signal acquisition system of claim 8, further comprising:
a filter operable to accumulate power across multiple synchronization fields to obtain an enhanced correlation output; and
timing circuitry operable to locate a maximum of the enhanced correlation output over time to locate the predetermined bit pattern with respect to a system timing source.

15. A signal acquisition system comprising:
a signal correlator operable to correlate a received signal comprising a synchronization field expected to include repetitions of predetermined bit patterns A and B, with bit pattern A and bit pattern B to generate
a bit pattern A correlation output; and
a bit pattern B correlation output;
a symbol A processor in communication with the pattern A correlation output, the symbol A processor comprising:
a symbol A filter operable to accumulate power across multiple synchronization fields to obtain a symbol A enhanced correlation output; and
symbol A threshold logic operable to determine when the enhanced correlation output exceeds a threshold and in response output a symbol A count signal; and
a symbol A bit sum calculator configured to accumulate the count signal to obtain a symbol A matching count;
a symbol B processor in communication with the pattern B correlation output, the symbol B processor comprising:
a symbol B filter operable to accumulate power across multiple synchronization fields to obtain a symbol A enhanced correlation output; and
symbol B threshold logic operable to determine when the enhanced correlation output exceeds a threshold and in response output a symbol B count signal; and
a symbol B bit sum calculator configured to accumulate the count signal to obtain a symbol B matching count;
timing circuitry in communication with the symbol A enhanced correlation output and a symbol B enhanced correlation output and operable to locate a maximum of the symbol A enhanced correlation output and the symbol B enhanced correlation output over time to locate the predetermined bit pattern with respect to a system timing source; and
a finite state machine in communication with the timing circuitry, the symbol A count signal, and the symbol B count signal and operable to determine whether a frame of type A has been acquired or whether a frame of type B has been acquired.

16. The signal acquisition system of claim 15, where:
the timing circuitry is in communication with the symbol A enhanced correlation output through a symbol A complex conjugate multiplier and is in communication with the symbol B enhanced correlation output through a symbol B complex conjugate multiplier.

17. The signal acquisition system of claim 15, where:
the symbol A processor comprises a symbol A output selector comprising, as inputs:
the symbol A count signal; and
a placeholder value configured to indicate that the symbol A processor has not yet found a phase reversal in the synchronization field; and
the symbol B processor comprises a symbol B output selector comprising, as inputs:
the symbol B count signal; and
a placeholder value configured to indicate that the symbol B processor has not yet found a phase reversal in the synchronization field.

18. The signal acquisition system of claim 15, where the state machine comprises:
- a type A detection state;
- a type B detection state;
- a run state;
- a first state transition to the type A detection state according to first predetermined indicia of receiving a type A frame in the received signal; and
- a second state transition to the type B detection state according to second predetermined indicia of receiving a type B packed in the received signal.

19. The signal acquisition system of claim 18, where the state machine further comprises:
- an acquire state;
- a third state transition from the type A detection state to the acquire state according to third predetermined indicia of acquiring a type A frame in the received signal; and
- a fourth state transition from the type B detection state to the acquire state according to fourth predetermined indicia of acquiring a type B frame in the received signal.

20. The signal acquisition system of claim 18, where the state machine further comprises:
- a fifth state transition from the type A detection state to the run state according to fifth predetermined indicia of not receiving a type A frame in the received signal; and
- a sixth state transition from the type B detection state to the run state according to sixth predetermined indicia of not receiving a type B frame in the received signal.

* * * * *